(12) United States Patent
Hauzenberger et al.

(10) Patent No.: US 8,317,898 B2
(45) Date of Patent: Nov. 27, 2012

(54) METHOD AND DEVICE FOR PRODUCING MOLTEN MATERIAL

(75) Inventors: Franz Hauzenberger, Linz (AT); Robert Millner, Loosdorf (AT); Norbert Rein, Vienna (AT); Johannes Schenk, Linz (AT); Martin Schmidt, Leonding (AT); Bogdan Vuletic, Dusseldorf (DE); Kurt Wieder, Schwertberg (AT); Johann Wurm, Bad Zell (AT)

(73) Assignee: Siemens Vai Metals Technologies GmbH (AT)

( * ) Notice: Subject to any disclaimer, the term of this patent is extended or adjusted under 35 U.S.C. 154(b) by 545 days.

(21) Appl. No.: 12/445,358

(22) PCT Filed: Oct. 1, 2007

(86) PCT No.: PCT/EP2007/008515
§ 371 (c)(1),
(2), (4) Date: May 8, 2009

(87) PCT Pub. No.: WO2008/046504
PCT Pub. Date: Apr. 24, 2008

(65) Prior Publication Data
US 2010/0043599 A1      Feb. 25, 2010

(30) Foreign Application Priority Data

Oct. 13, 2006   (DE) .................. 10 2006 048 600

(51) Int. Cl.
*C22B 9/00*          (2006.01)
(52) U.S. Cl. ........................................ 75/575

(58) Field of Classification Search ............. 75/10.1, 75/10.15–10.17, 10.35, 10.36–10.66, 443–505, 75/507–584
See application file for complete search history.

(56) References Cited

U.S. PATENT DOCUMENTS

| | | |
|---|---|---|
| 4,317,677 A | 3/1982 | Weber et al. |
| 4,685,964 A | 8/1987 | Summers et al. |
| 5,582,029 A | 12/1996 | Occhialini et al. |
| 5,643,354 A * | 7/1997 | Agrawal et al. .................. 75/490 |
| 5,669,955 A | 9/1997 | Vuletic et al. |

FOREIGN PATENT DOCUMENTS

DE       28 43 303 C2    12/1982
(Continued)

OTHER PUBLICATIONS

International Search Report dated Mar. 20, 2008, issued in corresponding international application No. PCT/EP2007/008515.
(Continued)

*Primary Examiner* — Scott Kastler
*Assistant Examiner* — Vanessa Luk
(74) *Attorney, Agent, or Firm* — Ostrolenk Faber LLP

(57) ABSTRACT

In a method for the production of molten metal, oxygen, a reducing agent and iron reduced in a reduction reactor are introduced into a melt gasifier, the reducing agent is gasified with oxygen and the reduced iron is melted by the heat which occurs, the cupola gas being used as at least a fraction of the reduction gas. Reacted top gas is drawn off from the reduction reactor. For increased efficiency at least part of the heat energy of the top gas and/or of the fraction of the reduction gas which is provided for use as cooling gas and as excess gas to be utilized for the indirect heating of at least one further gas used in the method.

23 Claims, 1 Drawing Sheet

FOREIGN PATENT DOCUMENTS

| | | |
|---|---|---|
| DE | 36 28 102 A1 | 4/1987 |
| DE | 42 40 197 C2 | 4/1996 |
| EP | 1062369 | 12/2000 |
| EP | 1 826 281 A | 8/2007 |
| FR | 2120076 | 8/1972 |
| GB | 1 348 939 A | 3/1974 |
| GB | 1348939 | 3/1974 |
| RU | 2272849 | 3/2006 |
| WO | WO 99/46411 | 9/1999 |
| WO | WO 99/46411 A | 9/1999 |

OTHER PUBLICATIONS

Russian Office Action, dated Jan. 13, 2012, issued in corresponding Russian Patent Application No. 2009117816/02 (024559), 9 pages.
English translation of Russian Office Action, 7 pages. Total 16 pages.

* cited by examiner

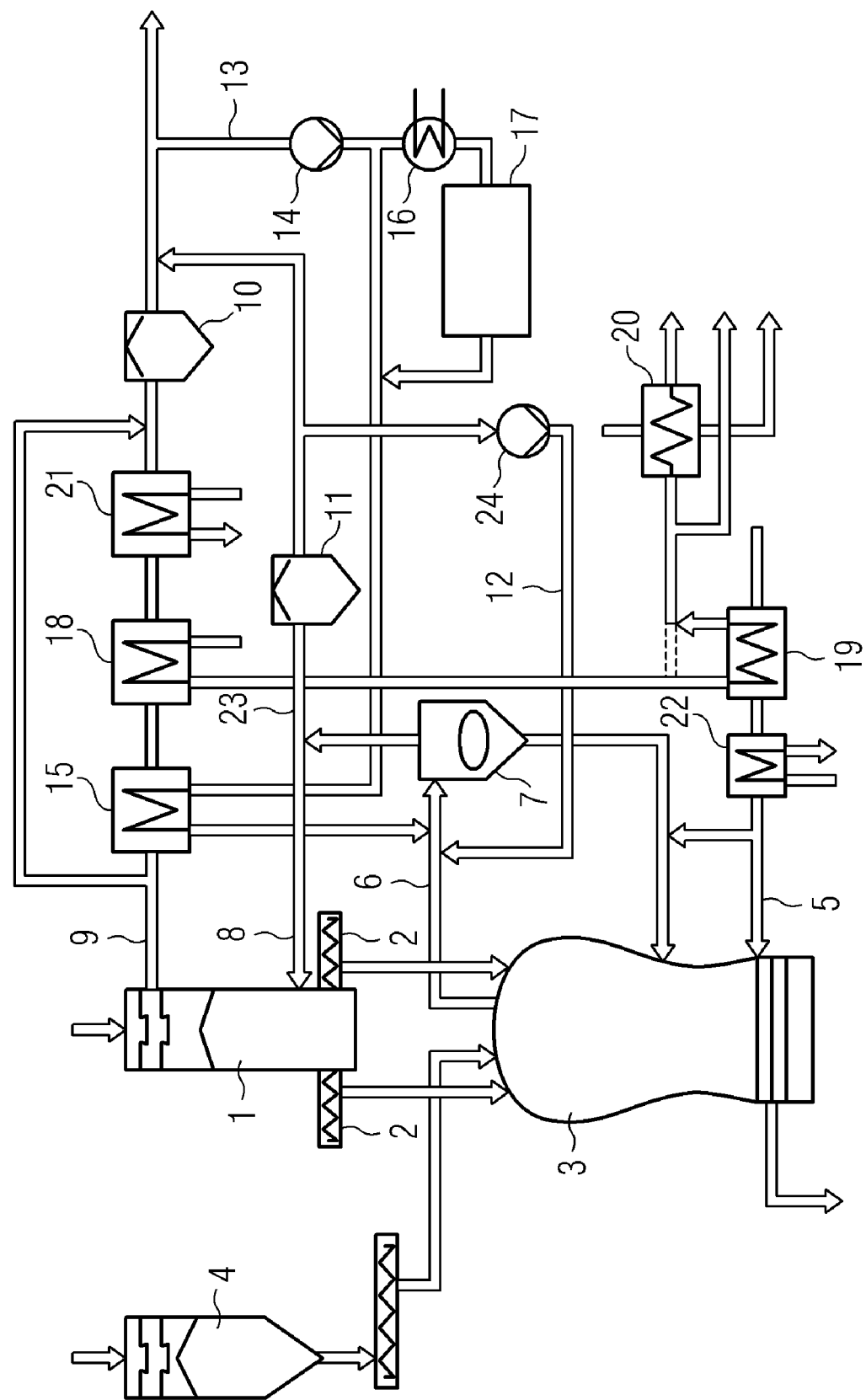

METHOD AND DEVICE FOR PRODUCING MOLTEN MATERIAL

CROSS REFERENCE TO RELATED APPLICATION

The present application is a 35 U.S.C. §§371 national phase conversion of PCT/EP2007/008515, filed Oct. 1, 2007, which claims priority of German Application No. 10 2006 048 600.5, filed Oct. 13, 2006, the disclosure of which is incorporated by reference herein. The PCT International Application was published in the German language.

BACKGROUND OF THE INVENTION

The invention relates to a method for the production of molten metal. Oxygen, a reducing agent and iron reduced in a reduction reactor are introduced into a melt gasifier. The reducing agent is gasified with the oxygen. The reduced iron is melted by means of the heat which occurs in this case. The cupola gas from the melt gasifier is used as at least a fraction of the reduction gas. Reacted top gas is drawn off from the reduction reactor. The invention also relates to a plant for carrying out the method, including one or more reduction reactors having a reduction gas supply, a melt gasifier having an oxygen supply, and a supply system for reducing agent, at least one line for the supply of the cupola gas from the melt gasifier into the reduction reactor and at least one line for drawing off the top gas from the reduction reactor.

In melt reduction plants, as described, for example, in DE 36 28 102 A1, oxygen with a temperature of 25° C. and a purity of ≧95% by volume is injected into the melt gasifier via the nozzles in order to gasify the reducing agents (predominantly coal and coal briquets) and make the required heat available for melting the reduced iron. The cupola gas from the melt gasifier (ESV) is used for indirect reduction in a fixed-bed reduction shaft (FBRS) or in fluidized-bed reactors (WSR), and is thereafter drawn off as top gas. The purified export gas, which is composed of the blast furnace gas from the direct reduction assembly and of the cupola gas from the melt gasifier, has the following typical analysis at 1.5 barg: CO 45% by volume, $CO_2$ 30% by volume, $H_2$ 19% by volume, $H_2O$ 3% by volume and $N_2$ 3% by volume. It has to be delivered for utilization and overall energy optimization on account of the gas excess.

However, not only the top gas or export gas from melt reduction plants contains large sensible heat quantities (top gas temperatures lie around 250° C.-500° C.), but also the fraction of the reduction gas which is not introduced into the reduction reactor, but is used as excess gas for the pressure regulation of the plant and as cooling gas. The temperature of the reduction gas lies around 700° C.-900° C. To utilize export gas in a power station (steam power station or gas and steam power station) or for metallurgic utilization (for example, direct reduction plant), the gas has to be purified of the impurities (dust, tar) contained in it. For this purpose, nowadays, wet scrubbers are mostly used, which at the same time cool the gas to about 40-45° C. and thereby extract the predominant fraction of the sensible heat from the gas. The heat is dissipated by the process water and discharged into the surroundings by a cooling tower.

SUMMARY OF THE INVENTION

The object of the present invention, therefore, is to specify a method and a plant, as initially described, having increased energy and raw material efficiency.

To achieve this object, according to the invention, the method is characterized in that at least part of the heat energy of the top gas and/or of the fraction of the reduction gas which is provided for use as cooling gas and as excess gas is utilized for the indirect heating of at least one further gas used in the method.

According to a first method variant according to the invention, there is provision for at least part of the top gas to be recirculated into the reduction reactor after at least cooling or cleaning and heat exchange with the hot process gas. By the recirculation gas being heated after heat exchange with the top gas or the cooling gas from approximately 40° C. to 400° C., larger quantities of this gas can be recirculated upstream of the reduction shaft and utilized as reduction gas, without the installation of a reduction gas heating furnace being required.

According to a possible method variant according to the invention, there is provision for cleaning to take place by means of a wet wash. This allows simultaneous cooling or cleaning.

For this purpose, advantageously, there is provision for the recirculated heated top gas to be administered to the cupola gas and to be supplied, together with the latter, to the reduction reactor, preferably particulate contents, before entering the reduction reactor, being separated from the gas mixture.

According to a further method variant according to the invention, at least part of the top gas can be introduced into the melt gasifier after at least cooling or cleaning, and heat exchange with the top gas and/or of the fraction of the reduction gas which is provided for use as cooling gas and as excess gas. By the gas recirculated into the melt gasifier being heated, higher injection rates of top gas, recirculated product gas from a $CO_2$ removal plant (for example, pressure exchange plant, amine scrub, Benfield scrub, etc.), from fine coal injection or synthetic injection, etc. are possible, since heating is compensation for the adiabatic flame temperature (RAFT) which per se is lowered due to injection.

In all instances, advantageously, the recirculated top gas is compressed before heat exchange and/or its carbon dioxide content is reduced, preferably to 2 to 3% by volume, after cooling, preferably to 30 to 50° C.

A further variant of the method is characterized, according to the invention, in that the heat energy of the top gas and/or of the fraction of the reduction gas which is provided for use as cooling gas and as excess gas is used for heating the oxygen for the melt gasifier. The heat released during the gasification of the coal, coal briquets and, if appropriate, coke with oxygen is required for calcining the aggregates, for heating the fixed bed in the melt gasifier (coal, coal briquets, DRI, additives) and for melting the DRI. The higher temperature of the oxygen which is injected into the melt gasifier via the nozzles or via the dust burners results in a lower reducing agent consumption and therefore a saving of coal and coal briquets as reducing agents. Furthermore, the quantity of oxygen can likewise be reduced. By the oxygen being preheated, higher injection rates of top gas, recirculated product gas from a $CO_2$ removal plant, from fine coal injection or synthetic injection, etc. likewise become possible, and, in combination with the recirculation of a heated top gas or of product gas generated from it into the melt gasifier, the recirculation quantity of top gas or product gas, etc. can be maximized.

For safety reasons, in this case, there is provision for heat exchange between the top gas and/or the fraction of the reduction gas which is provided for use as cooling gas and as excess gas and the oxygen to take place via a transfer medium and two heat exchange processes. In this case, waste $N_2$ or steam is preferably employed.

Advantageously, the transfer medium, after heat exchange with the oxygen, may be utilized, at most together with a part stream of the uncooled transfer medium, for the preheating of combustion gas required in the method.

In any case, there may also be provision for the heat energy of the top gas and/or of the fraction of the reduction gas which is provided for use as cooling gas and as excess gas to be utilized for steam generation.

Preferably, in this case, the heat energy of the steam is used for heating the oxygen for the melt gasifier.

The plant initially described is characterized, according to the invention, in order to achieve the set object, by at least one heat exchanger in a line for drawing off the top gas and/or in the cooling gas and excess gas system, at least one further gas used in the method flowing through said heat exchanger.

What is in this case to be understood as a cooling gas and excess gas system is the line system through which that fraction of the reduction gas which is intended for use as cooling gas and as excess gas flows after being separated from the reduction gas stream conducted into the reduction reactor.

According to a possible embodiment according to the invention, the cleaning assembly is designed as a wet washer, so that cooling and cleaning can take place simultaneously.

In order to avoid dust deposits in the heat exchangers, there is advantageously provision for the or each heat exchanger to be designed as a tube heat exchanger or tube-bundle heat exchanger and to have the top gas flowing through them from above downward.

According to a further embodiment according to the invention, a return line for the top gas emanates downstream of the cooling and cleaning assembly for the top gas and leads to the heat exchanger, and the return line leads from the heat exchanger further on to the reduction reactor. Consequently, a large quantity of gas can be recirculated and used as reduction gas without an additional reduction gas heating furnace.

Advantageously, in this case, there is provision for the return line from the heat exchanger to issue into the connecting line for the cupola gas between the melt gasifier and reduction reactor, preferably upstream of any particle separator.

A further embodiment according to the invention is characterized in that a return line for the top gas emanates downstream of the cooling and cleaning assembly and leads to the heat exchanger, and in that the return line leads from the heat exchanger further on to the melt gasifier, preferably runs as far as the issue of the oxygen supply and parallel to the latter.

The highest possible flexibility in setting and influencing method parameters, in conjunction with the highest possible energy recovery in each case, is ensured in an advantageous embodiment of the plant in which a compressor, at most also a cooling device and a carbon dioxide reduction stage, are inserted upstream of the heat exchanger, the outlet of the compressor and the outlet of the carbon dioxide reduction stage leading into a common supply line to the heat exchanger.

So that the recovered heat energy can be utilized, even with the highest possible degree of safety, for heating the oxygen for the melt gasifier, the plant is advantageously configured in such a way that, in the oxygen supply to the melt gasifier, a further heat exchanger is inserted, which, together with at least one heat exchanger through which the top gas and/or the fraction of the reduction gas which is provided for use as cooling gas and as excess gas flows, forms a circuit through which a heat transfer fluid, preferably in liquid and/or vaporous form, flows.

In this case, for optimal energy utilization in the process, there may be provision for at least one further heat exchanger for at least one combustion gas required in the method to be arranged in the circuit of the heat transfer fluid.

BRIEF DESCRIPTION OF THE DRAWING

The invention will be explained in more detail in the following description by means of a preferred exemplary embodiment and with reference to the accompanying drawing.

DESCRIPTION OF THE PREFERRED EMBODIMENT

Particulate or pellet-shaped iron ore, if appropriate with unburnt aggregates, is fed into a reduction shaft 1. The iron slurry generated in the reduction shaft 1 and the partially burnt (calcined) aggregates are introduced via discharge devices 2 into the head of a melt gasifier 3. At the bottom of the melt gasifier 3, liquid pig iron and, above this, liquid slag collect, which are drawn off preferably discontinuously via taps. The melt gasifier 3 is supplied from a storage shaft 4 with a gasification agent, preferably coal or coal briquets, in any case mixed with screened-out undersize of the iron ore, which could not otherwise be used for the reduction process. An oxygen-containing gas is supplied in the lower region of the melt gasifier 3 via gas lines 5.

The generated reduction gas is led out of the head of the melt gasifier 3 via a line 6, freed in a hot-gas cyclone 7 of solid constituents, in particular dust and fine-grained pyrolyzed coal, and then passes via a line 8 into the reduction shaft 1. In the latter, the reduction gas flows through the heap of iron ore and aggregates in countercurrent and at the same time reduces the iron ore into iron slurry and partially calcines the aggregates.

The pyrolyzed coal dust separated in the hot-gas cyclone 7 and other particulate contents are recirculated to the melt gasifier 3, preferably gasified when they enter the latter through dust burners which are arranged in the wall of the melt gasifier 3 and to which oxygen-containing gas is also delivered.

The at least partially consumed reduction gas is drawn off at the upper end of the reduction shaft 1 via a top gas line 9 and is supplied to the cleaning assembly 10 as export gas for utilization and overall energy optimization on account of the gas excess. A fraction of the reduction gas is used for regulating the pressure of the plant and as cooling gas. This fraction of the reduction gas is separated by means of the line 23 from the reduction gas stream conducted into the reduction shaft 1. The line 23 is therefore the first part of the cooling gas and excess gas system. The reduction gas used for regulating the pressure of the plant, called excess gas, is admixed to the export gas downstream of the cooling and cleaning assembly 11. The reduction gas used as cooling gas is recirculated, downstream of the cooling and cleaning assembly 11 and after compression in the compressor 24, into the line 6 via the line 12 upstream of the hot-gas cyclone 7.

In order, then, to make the export gas usable for the process itself in an energy-optimal way and preferably employ it at least as a fraction of the reduction gas required in the reduction shaft 1, at least part of the export gas is branched off, downstream of the cleaning assembly 10, via a line 13 and compressed by means of a compressor 14 having as high a suction pressure as possible.

In any event, excess gas can also be branched off and recirculated, downstream of the cooling and cleaning assembly 11, via a further line, even before being admixed to the export gas.

The recirculated export gas is heated from a temperature downstream of the cooling and cleaning assembly of approximately 40° C. to about 400° C., utilizing the energy content of the top gas which is drawn off directly from the reduction shaft 1 and has a temperature between approximately 250° C. and 500° C. For this purpose, the line 9 for the top gas also has inserted in it, upstream of the cleaning assembly 10, a heat exchanger 15, through which that fraction of the export gas which has branched off via the line 13 also flows. The heated export gas, after running through the heat exchanger 15, is fed into the line 6 for the cupola gas of the melt gasifier 3, also upstream of the hot-gas cyclone 7. The process thus improved has increased energy efficiency due to lower process water quantities required for cooling the top gas, which also means, further a reduction in the energy requirement for the process water pumps. There is likewise a reduction in the heat which is discharged from the top gas into the process water and which is lost via cooling towers or by evaporation causes water losses in the system which constantly have to be compensated.

In any event, at least a fraction of the export gas branched off via the line 13 can be supplied to the heat exchanger 15 after intermediate cooling to 30-50° C. in the cooler 16 and reduction of the $CO_2$ content to 2-3% by volume in the $CO_2$ removal plant 17. The cooled and $CO_2$-reduced gas could also be mixed with untreated recirculated gas, before entry into the heat exchanger 15, this being allowed by the exact setting of the temperature and/or $CO_2$ content in the recirculated gas.

The recirculated top gas, after passing through the heat exchanger 15, may also be introduced into the melt gasifier 3, preferably via lances introduced into the oxygen nozzles, the return line for the top gas running as far as the issue of the oxygen supply 5 and parallel to the latter. In this case, the recirculated top gas does not have to be heated by means of a reduction gas furnace, electrical heating or plasma burners, using external energy, but, instead, the heat energy of the top gas upstream of the cleaning assembly 10 is utilized. This affords the advantages, already listed above, of an increase in the energy efficiency of the process, smaller process water quantities required for cooling the top gas, a reduction in the energy requirement of the process water pumps, and a reduction in the heat which is discharged from the top gas into the process water and which is lost by cooling towers or by evaporation causes water losses in the system.

Alternatively or else additionally to the described heat exchanger 15 for the recirculated export gas, a heat exchanger 18 may be inserted into the line 9 for the top gas, upstream of the cleaning assembly 10, a heat transfer medium, such as, for example, waste $N_2$, flowing through said heat exchanger. The heat exchanger 18, together with a further heat exchanger 19, forms a circuit for the heat transfer medium. A gas to be supplied to the melt gasifier 3, preferably the oxygen to be injected, preferably flows through the heat exchanger 19 and is therefore heated by the energy content of the top gas indirectly and with the highest possible degree of safety on account of the nonreactive pairing of, for example, oxygen with the heat transfer medium. Owing to the higher temperature of the oxygen which is injected into the melt gasifier via the nozzles or via the dust burners, the result is a lower reducing agent consumption and therefore a saving of coal and coal briquet as reducing agents, since this heat can replace at least part of the heat which is released during the gasification of the coal, coal briquet and, if appropriate, coke with oxygen and which is required for calcining the aggregates, for heating the fixed bed in the melt gasifier (coal, coal briquets, DRI, additives) and for melting the DRI. Furthermore, the quantity of oxygen can likewise be reduced. By the oxygen being preheated, higher injection rates of top gas, recirculated product gas from a $CO_2$ removal plant, from fine coal injection or synthetic injection, etc. likewise become possible, and, in combination with the recirculation of heated top gas into the melt gasifier, the recirculation quantity of top gas or PSA product gas and their injection rates can be maximized.

Alternatively or additionally, a heat exchanger 20 may be inserted in the circuit of the heat exchanger 18 and of the heat transfer fluid flowing through it and absorbing the energy of the top gas, in which heat exchanger 20 combustion air or drying medium, for example air, $N_2$, exhaust gas or the like, is heated for an ore and/or coal dryer. Here, too, fuel can consequently be saved.

Finally, the alternative or additional arrangement of a heat exchanger 21 through which steam flows as a heat transfer fluid may also be envisaged as an alternative embodiment of the plant. This heat exchanger 21 then, in a similar way to that described above, forms a circuit together with a further heat exchanger 22, here, too, preferably a gas to be supplied to the melt gasifier 3 flowing through the heat exchanger 22.

Especially the heat exchanger 15, 18 and 21 through which the top gas flows are preferably designed as tubular or tube-bundle heat exchangers, the top gas, which, of course, is still contaminated upstream of the cleaning assembly 10, being routed in the vertical direction from the top downward, in order to avoid dust deposits.

Instead of being inserted in the line 9 for the top gas drawn off from the reduction shaft 1, the heat exchangers 15, 18 and 21 could or additional heat exchangers may also be inserted into the cooling gas and excess gas system which is characterized by somewhat lower gas quantities, but higher temperatures of approximately 750° C. to 850° C. What is preferred in this case is the arrangement of one or more heat exchangers in the line 23 for the reduction gas between the cleaning assembly 11 and the branch-off of line 8 (gas to the reduction shaft 1), in which case, on account of the high temperatures of the fraction of the reduction gas which flows in this line and is provided for use as cooling gas and as excess gas, reduction gas temperatures in the region of approximately 400° C. can be ensured, in spite of the heat exchange, but sufficient heat energy can nevertheless be transferred to the other process gases to be heated. In this case, a bypass line around the heat exchangers 15, 18, 21 may be provided both in the top gas system and in the cooling gas and excess gas system.

The invention claimed is:

1. A method for production of molten metal, the method comprising:
   inserting into a melt gasifier oxygen, a reducing agent and iron, the iron having been reduced from iron ore in at least one reduction reactor,
   wherein the reducing agent is gasified with the oxygen, which gasifying produces cupola gas, and the iron, which has been reduced from iron ore in the at least one reduction reactor, which reducing produces top gas, is melted by heat generated by the gasification in the melt gasifier, and using the cupola gas from the melt gasifier as at least a fraction of reduction gas, and drawing off top gas from the reduction reactor; and
   providing at least part of the heat energy of at least one of the top gas and of the fraction of the reduction gas for use as cooling gas and for use as excess gas for indirect heating of at least one further gas used in the method,
   wherein the further gases used in the method are top gas recirculated into the reduction reactor after at least cooling and cleaning, and top gas introduced into the melt gasifier after at least cooling and cleaning.

2. The method as claimed in claim 1, further comprising recirculating at least part of the top gas into the reduction reactor after at least cooling and cleaning the part of the top gas, and after heat exchange with at least one of the top gas and the fraction of the reduction gas which is provided for use as cooling gas and as excess gas.

3. The method as claimed in claim 2, wherein the cleaning of the top gas is done by a wet wash.

4. The method as claimed in claim 2, further comprising administering the recirculated heated top gas to the cupola gas, and supplying the heated top gas and the cupola gas together to the reduction reactor.

5. The method as claimed in claim 4, further comprising separating particulate contents from the gas mixture of the heated top gas and the cupola gas before the gas mixture enters the reduction reactor.

6. The method as claimed in claim 2, wherein the cooling of the part of the top gas is effected to 30 to 50° C.

7. The method as claimed in claim 2, comprising recirculating at least part of the top gas into the melt gasifier after at least cooling and cleaning the top gas, and heat exchange with at least one of the top gas and the fraction of the reduction gas which is provided for use as cooling gas and as excess gas in a cleaning assembly.

8. The method as claimed in claim 1, further comprising introducing at least part of the top gas into the melt gasifier after at least cooling and cleaning the part of the top gas, and after heat exchange with at least one of the top gas and the fraction of the reduction gas which is provided for use as cooling gas and as excess gas in a cleaning assembly.

9. The method as claimed in claim 8, further comprising at least one of compressing the introduced top gas before heat exchange and reducing carbon dioxide content of the top gas after cooling.

10. The method as claimed in claim 9, further comprising reducing the carbon dioxide content to 2 to 3% by volume.

11. The method as claimed in claim 1, further comprising utilizing the heat energy of at least one of the top gas and the fraction of the reduction gas which is provided for use as cooling gas and as excess gas for steam generation.

12. A method for the production of molten metal, the method comprising:
  inserting into a melt gasifier oxygen, a reducing agent and iron, the iron having been reduced from iron ore in at least one reduction reactor,
  wherein the reducing agent is gasified with the oxygen, which gasifying produces cupola gas, and the iron, which has been reduced from iron ore in the at least one reduction reactor, which reducing produces top gas, is melted by heat generated by the gasification in the melt gasifier, and using the cupola gas from the melt gasifier as at least a fraction of reduction gas, and drawing off top gas from the reduction reactor;
  providing at least part of the heat energy of at least one of the top gas and of the fraction of the reduction gas for use as cooling gas and for use as excess gas for indirect heating of oxygen for the melt gasifier; and
  recirculating at least part of the top gas into the reduction reactor after at least cooling and cleaning the part of the top gas, and after heat exchange with at least one of the top gas and the fraction of the reduction gas which is provided for use as cooling gas and as excess gas.

13. The method as claimed in claim 12, wherein the cleaning of the top gas is done by a wet wash.

14. The method as claimed in claim 12, further comprising administering the recirculated heated top gas to the cupola gas, and supplying the heated top gas and the cupola gas together to the reduction reactor.

15. The method as claimed in claim 14, further comprising separating particulate contents from the gas mixture of the heated top gas and the cupola gas before the gas mixture enters the reduction reactor.

16. A method for the production of molten metal, the method comprising:
  inserting into a melt gasifier oxygen, a reducing agent and iron, the iron having been reduced from iron ore in at least one reduction reactor,
  wherein the reducing agent is gasified with the oxygen, which gasifying produces cupola gas, and the iron, which has been reduced from iron ore in the at least one reduction reactor, which reducing produces top gas, is melted by heat generated by the gasification in the melt gasifier, and using the cupola gas from the melt gasifier as at least a fraction of reduction gas, and drawing off top gas from the reduction reactor;
  providing at least part of the heat energy of at least one of the top gas and of the fraction of the reduction gas for use as cooling gas and for use as excess gas for indirect heating of oxygen for the melt gasifier; and
  introducing at least part of the top gas into the melt gasifier after at least cooling and cleaning the part of the top gas, and after heat exchange with at least one of the top gas and the fraction of the reduction gas which is provided for use as cooling gas and as excess gas in a cleaning assembly.

17. The method as claimed in claim 16, further comprising at least one of compressing the introduced top gas before heat exchange and reducing carbon dioxide content of the top gas after cooling.

18. The method as claimed in claim 17, further comprising reducing the carbon dioxide content to 2 to 3% by volume.

19. The method as claimed in claim 16, wherein the cooling of the part of the top gas is effected to 30° C. to 50° C.

20. A method for the production of molten metal, the method comprising:
  inserting into a melt gasifier oxygen, a reducing agent and iron, the iron having been reduced from iron ore in at least one reduction reactor,
  wherein the reducing agent is gasified with the oxygen, which gasifying produces cupola gas, and the iron, which has been reduced from iron ore in the at least one reduction reactor, which reducing produces top gas, is melted by heat generated by the gasification in the melt gasifier, and using the cupola gas from the melt gasifier as at least a fraction of reduction gas, and drawing off top gas from the reduction reactor; and
  providing at least part of the heat energy of at least one of the top gas and of the fraction of the reduction gas for use as cooling gas and for use as excess gas for indirect heating of oxygen for the melt gasifier;
  wherein the heat exchange between the top gas and/or the fraction of the reduction gas, on the other hand and the oxygen on the other hand, takes place via a transfer medium and two heat exchange processes.

21. The method as claimed in claim 20, wherein after the heat exchange with the oxygen, the transfer medium is utilized, preferably together with a part of the uncooled transfer medium, for preheating of combustion gas required in the method.

22. A method for the production of molten metal, the method comprising:

inserting into a melt gasifier oxygen, a reducing agent and iron, the iron having been reduced from iron ore in at least one reduction reactor, wherein the reducing agent is gasified with the oxygen, which gasifying produces cupola gas, and the iron, which has been reduced from iron ore in the at least one reduction reactor, which reducing produces top gas, is melted by heat generated by the gasification in the melt gasifier, and using the cupola gas from the melt gasifier as at least a fraction of reduction gas, and drawing off top gas from the reduction reactor;

providing at least part of the heat energy of at least one of the top gas and of the fraction of the reduction gas for use as cooling gas and for use as excess gas for indirect heating of oxygen for the melt gasifier; and utilizing the heat energy of at least one of the top gas and the fraction of the reduction gas which is provided for use as cooling gas and as excess gas for steam generation.

23. The method as claimed in claim 22, further comprising using the heat energy of the steam for heating the oxygen for the melt gasifier.

* * * * *